US008656107B2

(12) United States Patent
Rabinovitch et al.

(10) Patent No.: US 8,656,107 B2
(45) Date of Patent: Feb. 18, 2014

(54) ON-DEMAND ALLOCATION OF CACHE MEMORY FOR USE AS A PRESET BUFFER

(75) Inventors: Alexander Rabinovitch, Kfar Yona (IL); Leonid Dubrovin, Karney Shomron (IL)

(73) Assignee: LSI Corporation, San Jose, CA (US)

( * ) Notice: Subject to any disclaimer, the term of this patent is extended or adjusted under 35 U.S.C. 154(b) by 201 days.

(21) Appl. No.: 13/437,537

(22) Filed: Apr. 2, 2012

(65) Prior Publication Data

US 2013/0262772 A1 Oct. 3, 2013

(51) Int. Cl.
*G06F 12/08* (2006.01)
(52) U.S. Cl.
CPC .................................. *G06F 12/0871* (2013.01)
USPC ......................................................... 711/128
(58) Field of Classification Search
CPC ........................... G06F 12/0871; G06F 12/0873
See application file for complete search history.

(56) References Cited

U.S. PATENT DOCUMENTS

| 5,249,271 A | 9/1993 | Hopkinson et al. |
| 8,117,396 B1 * | 2/2012 | Fair et al. ..................... 711/133 |
| 2005/0192935 A1 * | 9/2005 | Rajamani et al. ................ 707/3 |
| 2012/0324195 A1 * | 12/2012 | Rabinovitch et al. ......... 711/170 |

* cited by examiner

*Primary Examiner* — Hiep Nguyen
(74) *Attorney, Agent, or Firm* — Otterstedt, Ellenbogen & Kammer, LLP

(57) ABSTRACT

A data processing system comprises data processing circuitry, a cache memory, and memory access circuitry. The memory access circuitry is operative to assign a memory address region to be allocated in the cache memory with a predefined initialization value. Subsequently, a portion of the cache memory is allocated to the assigned memory address region only after the data processing circuitry first attempts to perform a memory access on a memory address within the assigned memory address region. The allocated portion of the cache memory is then initialized with the predefined initialization value.

21 Claims, 5 Drawing Sheets

FIG. 4

| INDICATOR # | STARTING MEMORY ADDRESS | ENDING MEMORY ADDRESS | STATUS INDICATOR |
|---|---|---|---|
| 0 | 0x4000 | 0x407f | UNACCESSED |
| 1 | 0x4080 | 0x40ff | UNACCESSED |
| ... | ... | ... | ... |
| 63 | 0x5f80 | 0x5fff | UNACCESSED |

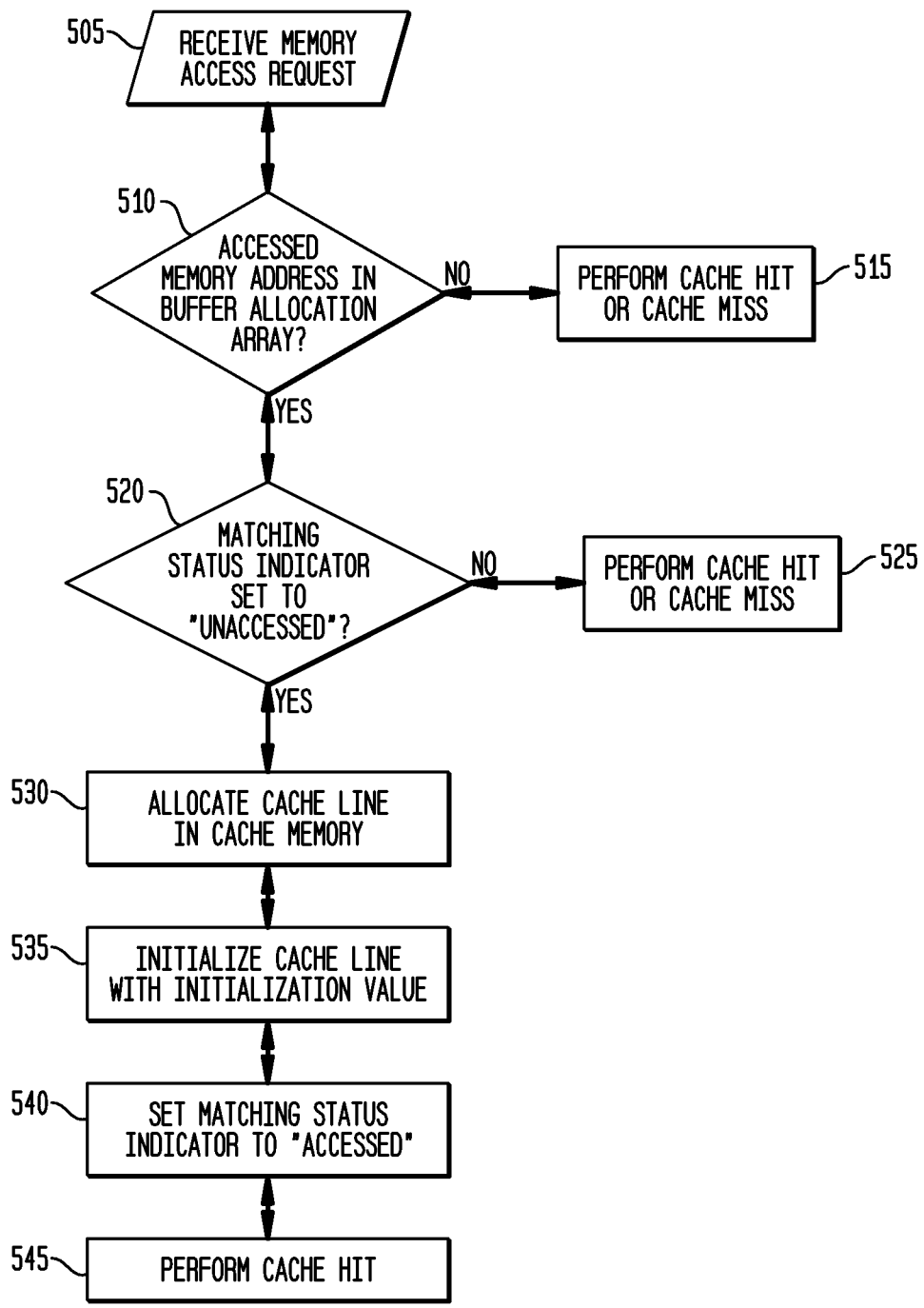

ON-DEMAND ALLOCATION OF CACHE MEMORY FOR USE AS A PRESET BUFFER

BACKGROUND

Cache memories are commonly utilized to improve the performance of data processors that must access data located in slow and/or distant main memory. A cache memory is typically much smaller than a main memory, but substantially faster. When a data processor needs to read data from memory, it first determines whether that memory location is stored in a cache memory. If the processor finds that the memory location is in the cache memory, a "cache hit" occurs and the data processor reads the data from the faster cache memory. If, on the other hand, the data is not available in the cache memory, a "cache miss" occurs. A cache miss slows execution while the required data is fetched from the slower main memory. The fetched data is also typically stored in the cache memory for later use.

Many applications utilize memory caches to function as buffers of data. Buffers that are assumed to be initialized in advance with known values are commonly called "preset buffers." Only new or different values are typically written to these preset buffers while an application is executed. Less sophisticated forms of these applications may simply initialize a preset buffer by writing default values (e.g., logical zeros) to memory. During these writes, a series of cache misses occurs while the preset buffer is installed in the cache memory. Those cache misses cause an increase in program execution cycles and also consume power. More advanced forms of these applications, in contrast, may attempt to pre-fetch data into the preset buffer in order to populate the cache memory with preset data before an application is started, or very soon thereafter. The presence of the preset data in the cache memory avoids the need to populate the preset buffer solely by cache misses. Delays due to cache misses are thereby reduced. Despite this benefit, however, pre-fetching data in this manner, even if done in background, can delay the treatment of regular cache misses, and also does not save the power required to access the main memory.

SUMMARY

Illustrative embodiments of the invention relate to apparatus and methods for use in allocating a cache memory for use as a preset buffer in an "on-demand" fashion. When a new application asserts a buffer allocation request, a cache memory is not immediately provisioned with buffer initialization values. Instead, such provisioning is allowed to be performed incrementally as actual memory accesses are made on the relevant memory addresses. In this manner, a cache memory need not necessarily be substantially overwritten (i.e., "flooded") every time a task switch calls for the implementation of a new preset buffer. Program execution cycles, bus transactions, power consumption, and interference with other currently running tasks are thereby reduced.

In accordance with an embodiment of the invention, a data processing system comprises data processing circuitry, a cache memory, and memory access circuitry. The memory access circuitry is operative to assign a memory address region to be allocated in the cache memory with a predefined initialization value. Subsequently, a portion of the cache memory is allocated to the assigned memory address region only after the data processing circuitry first attempts to perform a memory access on a memory address within the assigned memory address region. The allocated portion of the cache memory is then initialized with the predefined initialization value.

In accordance with another embodiment of the invention, a method for initializing a buffer in a cache memory of a data processing system comprises assigning a memory address region to be allocated in the cache memory with a predefined initialization value. A portion of the cache memory is allocated to the assigned memory address region only after the data processing circuitry first attempts to perform a memory access on a memory address within the assigned memory address region. Lastly, the allocated portion of the cache memory is initialized with the predefined initialization value.

In accordance with yet another embodiment of the invention, an integrated circuit comprises data processing circuitry, a cache memory, and memory access circuitry. The memory access circuitry is operative to assign a memory address region to be allocated in the cache memory with a predefined initialization value. Later, a portion of the cache memory is allocated to the assigned memory address region only after the data processing circuitry first attempts to perform a memory access on a memory address within the assigned memory address region. The allocated portion of the cache memory is then initialized with the predefined initialization value.

In accordance with even one more embodiment of the invention, memory access circuitry is provided for a data processing system comprising data processing circuitry and a cache memory. The memory access circuitry comprises a means for assigning a memory address region to be allocated in the cache memory with a predefined initialization value. The memory access circuitry, moreover, comprises a means for allocating a portion of the cache memory to the assigned memory address region only after the data processing circuitry first attempts to perform a memory access on a memory address within the assigned memory address region. Lastly, the memory access circuitry comprises a means for initializing the allocated portion of the cache memory with the predefined initialization value.

Embodiments of the present invention will become apparent from the following description of embodiments thereof, which are to be read in connection with the accompanying drawings.

BRIEF DESCRIPTION OF THE DRAWINGS

The following drawings are presented by way of example only and without limitation, wherein like reference numerals (when used) indicate corresponding elements throughout the several views, and wherein:

FIG. 4 shows at least a portion of a buffer allocation array in the FIG. 1 data processing system, in accordance with an illustrative embodiment of the invention; and FIG. 5 shows a flowchart of an exemplary method for performing a memory access in the FIG. 1 data processing system, in accordance with an illustrative embodiment of the invention.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION

The present invention, according to aspects thereof, will be described herein in the context of illustrative data processing systems. It should be understood, however, that the present invention is not limited to these or any other particular system arrangements. Rather, techniques of the invention are more generally applicable to any system including data processing circuitry which accesses cache memory and main memory. As a result, it will become apparent to those skilled in the art given the teachings herein that numerous modifications can be made to the embodiments shown that are within the scope of the present invention. That is, no limitations with respect to the specific embodiments described herein are intended or should be inferred.

Figure 1:
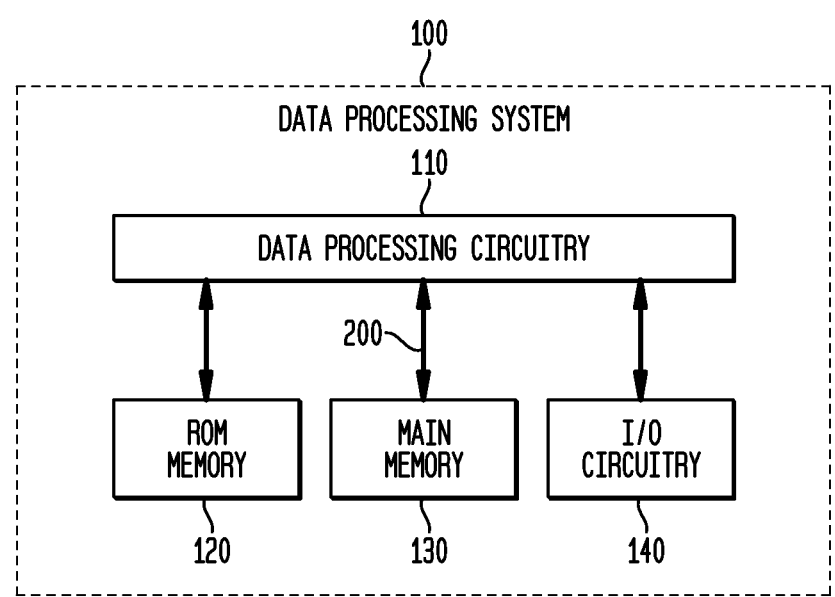
FIG. 1 shows a block diagram of at least a portion of a data processing system in accordance with an illustrative embodiment of the invention.

FIG. 1 shows a block diagram of at least a portion of a data processing system 100 in accordance with an illustrative embodiment of the invention. The data processing system 100 comprises data processing circuitry 110, which is in signal communication with a read-only memory (ROM) 120, a main memory 130, and input/output (I/O) circuitry 140. When implemented, the data processing system 100 may take on a number of different physical forms. Embodiments of the invention may comprise, as just a few examples, a desktop computer, a laptop computer, a netbook, a personal digital assistant, a workstation, a server, a mainframe computer, a mobile device (e.g., cellular telephone or tablet computer), an embedded system, and the like. Aspects of the invention are thereby widely applicable.

Many of the base functions of the elements shown in FIG. 1 will be familiar to one skilled in the computer arts. Moreover, many of these functions are also described in readily available publications, such as M. Balch, *Complete Digital Design: A Comprehensive Guide to Digital Electronics and Computer System Architecture*, McGraw-Hill, New York, 2003, which is hereby incorporated by reference herein. In one or more embodiments of the invention, the data processing circuitry 110, for example, is operative to perform at least one of logic, arithmetic, and control functions within the data processing system 100. The ROM 120 is, in turn, operative to store instructions and data (e.g., boot code) that are needed by the data processing circuitry 110 when powering up. The ROM 120 may also store predefined instructions and/or data utilized by the data processing circuitry 110 subsequent to powering up. The main memory 130 stores instructions and data needed by the data processing circuitry 110 when executing one or more applications. Lastly, the I/O circuitry 140 allows the data processing system 100 to interface with external devices (e.g., monitors, keyboards, speakers, mice, and printers) and data networks (e.g., local area networks and wide area networks) by means of one or more wired and/or wireless connections.

Because of its need for long-term storage even without power, the ROM 120 may comprise, for example, a form of non-volatile memory such as, but not limited to, mask-programmed ROM, programmable ROM (PROM), erasable PROM (EPROM), electrically-erasable PROM (EEPROM), flash memory, and the like. The main memory 130, in contrast, may comprise a form of volatile memory such as, but not limited to, static random access memory (SRAM), dynamic random access memory (DRAM), and so on.

Figure 2:
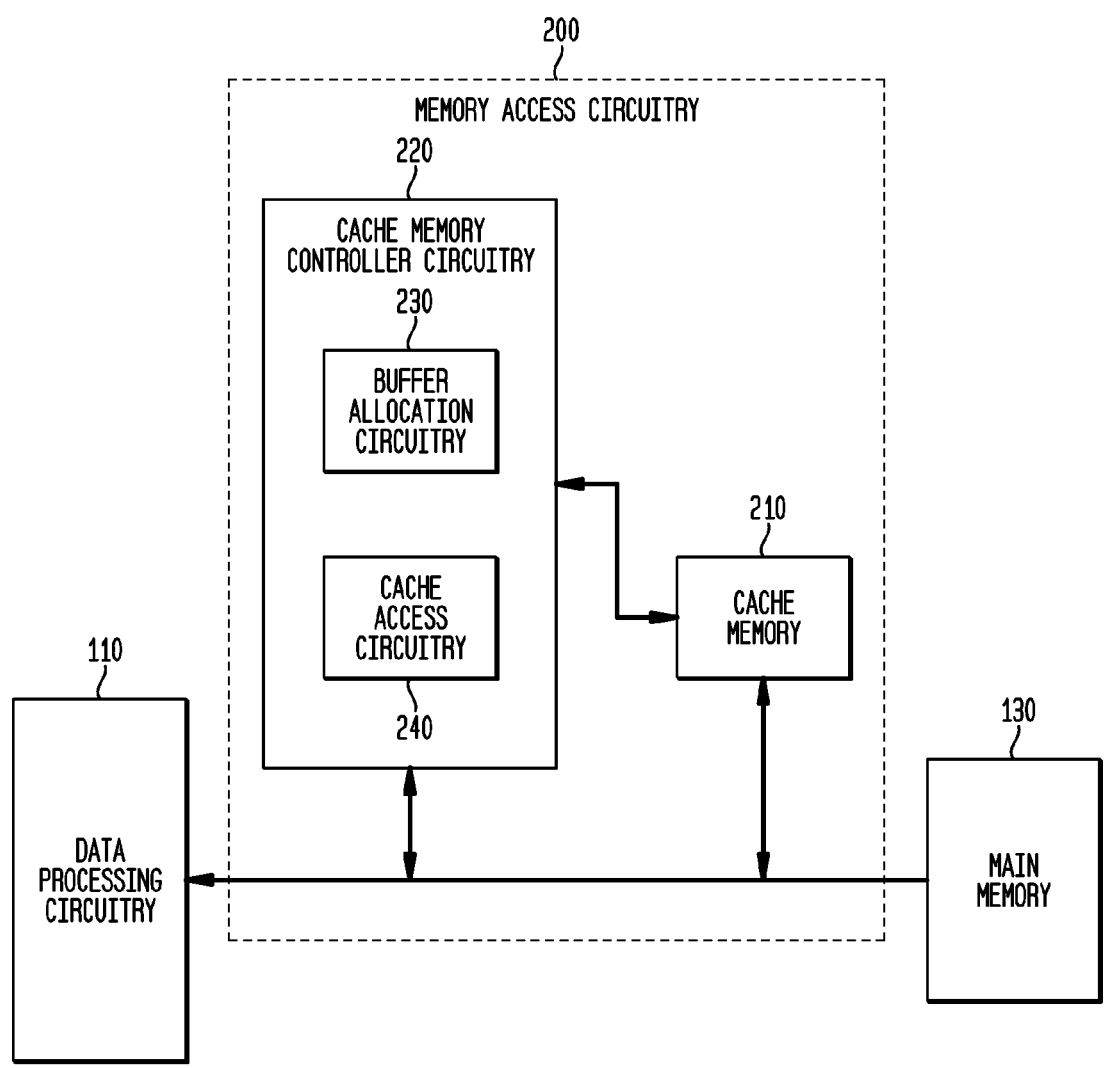
FIG. 2 shows a block diagram of at least a portion of the memory access circuitry in the FIG. 1 data processing system, in accordance with an illustrative embodiment of the invention.

The data processing system 100 is preferably operative to access the main memory 130 by memory access circuitry 200, represented in FIG. 1 by an arrow. FIG. 2 shows a block diagram of at least a portion of the memory access circuitry 200, in accordance with an illustrative embodiment of the invention. As indicated in FIG. 2, the memory access circuitry 200 comprises a cache memory 210 and cache memory controller circuitry 220. The cache memory controller circuitry 220 further comprises buffer allocation circuitry 230 and cache access circuitry 240.

As will be explained in greater detail below, embodiments of the invention utilize the memory access circuitry 200 to manage memory accesses generated by the data processing circuitry 110. The memory accesses may be read accesses, wherein the data processing circuitry 110 is attempting to read data from memory, or may be write accesses, wherein the data processing circuitry 110 is attempting to write data to memory. It should be noted that the term "data" as used herein is intended to include any machine-readable information and program code capable of being stored in an electronic memory. Thus, as used herein, the term "data" is to be construed broadly and is intended to encompass both instructions and non-instructions. The cache memory 210 may therefore comprise what is commonly called an "instruction cache," a "data cache," or a combination thereof.

The cache memory 210 is preferably relatively small and relatively fast when compared to the main memory 130, and is preferably located closer to the data processing circuitry 110 than the main memory 130. The cache memory 210 may, for example, comprise a relatively small quantity of SRAM. In one or more non-limiting embodiments of the invention, the cache memory 210 may have a storage capacity of tens of kilobytes, while the main memory 130, in comparison, may have a storage capacity of tens of gigabytes. Moreover, the cache memory 210 may be located in the same integrated circuit as the data processing circuitry 110 so as to reduce delays caused by signal transit times. In one or more embodiments of the invention, for example, the data processing circuitry 110 and the cache memory 210 are formed on a single integrated circuit, such as a central processing unit (CPU) integrated circuit. The data processing circuitry 110 is thereby operative to access the cache memory 210 substantially faster than it can access the main memory 130.

The cache memory 210 may be organized in several different ways including as a set of cache lines (sometimes called "cache blocks"). Depending on the application, the cache lines may be of various sizes including, but not limited to, 16 bytes, 32 bytes, 64 bytes, 128 bytes, and so on. For identification and access, each cache line is preferably associated with a respective index number, which is a unique number used to refer to that location in the cache memory 210.

Once so configured, the data processing system 100 may implement unique methods for provisioning data to the cache memory 210. Such methods are of particular benefit when utilizing the cache memory 210 as a preset buffer, and such a use is therefore assumed in the description that follows. Nevertheless, such an assumption is solely for illustrative purposes and should not be construed as limiting the scope of the invention. As stated earlier, aspects of the invention are more generally applicable to any data processing system wherein data processing circuitry accesses a cache memory and a main memory.

Figure 3:
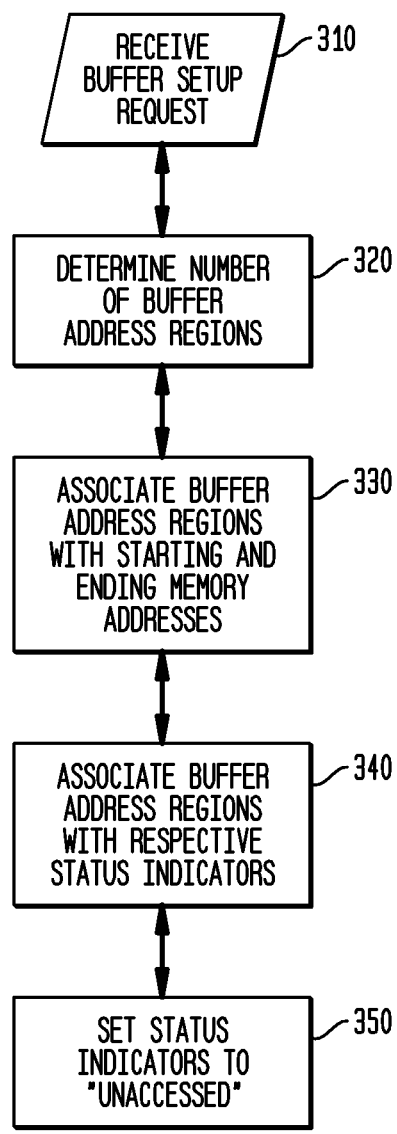
FIG. 3 shows a flowchart of an exemplary method for allocating a buffer in the FIG. 1 data processing system, in accordance with an illustrative embodiment of the invention.

One such method, in accordance with an illustrative embodiment of the invention, may be roughly broken into two phases: a buffer allocation phase and a memory access phase. FIG. 3 shows a flowchart of an exemplary method 300 for performing the buffer allocation phase, according to an embodiment of the invention. In a step 310, the memory access circuitry 200, and more particularly, the buffer allocation circuitry 230 (see FIG. 2), receives a buffer allocation request from the data processing circuitry 110 to initialize a preset buffer. The buffer allocation request may originate from the data processing circuitry 110, for example, as a result of executing computer-readable program code (e.g., a software application) which calls for the establishment of such a buffer. Such a buffer allocation request preferably at least specifies (in no particular order): 1) a starting memory address from which the buffer is to begin its coverage of the memory address space (hereinafter, the "buffer starting address"); 2) a size of the buffer; and 3) an initialization value for the buffer. As will be further detailed below, the buffer initialization value is the preset value to be stored in the buffer when the buffer is first installed into the cache memory 210.

The address space covered by the buffer is subsequently divided into a plurality of buffer address regions. Each buffer address region covers a cache-line sized region of the memory address space. More particularly, upon receiving the buffer allocation request in step 310, the buffer allocation circuitry 230 determines the number of buffer address regions required to encompass the address space covered by the buffer, as indicated in a step 320. This number is calculated by simply dividing the size of the buffer by the length of the cache lines in the cache memory 210:

Number of Buffer Address Regions=Buffer Size/ Cache Line Length.

If, as just one non-limiting example, the buffer allocation request specifies a buffer size of 8,192 bytes, and the cache memory 210 includes cache lines with lengths of 128 bytes, the number of buffer address regions determined in step 320 would be 64. In other words, a buffer formed in accordance with these specified values would be assigned 64 buffer address regions. Each of the buffer address regions would cover 128 bytes of the memory address space.

Subsequently, in a step 330, the buffer allocation circuitry 230 associates each of the buffer address regions determined in step 320 with a respective starting memory address and a respective ending memory address. Results of the associations performed in step 330 may be stored in local RAM to ensure that subsequent accesses to this information may be performed with low access latencies. FIG. 4 shows an example of a buffer allocation array representing various such associations, according to an embodiment of the invention. For purposes of illustration only, it is assumed that the buffer allocation request specifies a buffer size of 8,192 bytes with a starting address of 0x4000 (in hexadecimal form). A cache line in the cache memory 210 is further assumed to again have a length of 128 bytes. In this example, each row of the buffer allocation array corresponds to a respective one of 64 different buffer address regions that are being assigned to the buffer (indicated by indicator number 0 through indicator number 63). Each buffer address region, in turn, is associated with a respective memory address region that covers 128 bytes of the memory address space, starting at the buffer starting address. The buffer address region with indicator number 0, for example, covers the memory address space between 0x4000 (i.e., the buffer starting address) and 0x407f. All of the 64 buffer address regions combine to cover the address memory space from 0x4000 to 0x5fff, which is 8,192 bytes in total.

With continued reference to FIG. 3, in a step 340, the buffer address regions forming the buffer are further associated with respective status indicators. These status indicators play a role in the memory access phase, which is further detailed below. The status indicators are preferably operative to at least indicate an "unaccessed" state and an "accessed" state, although the invention is not limited to any particular number of status indicators. In one or more embodiments, the status indicators may be implemented as, for example, data flags, each data flag consisting of a single data bit. When using such data flags, the data flags may be interpreted such that a logical zero state (i.e., logical "0" state) corresponds to an "unaccessed" state and a logical one state (logical "1" state) corresponds to an "accessed" state. That said, such an assignment is largely arbitrary and the reverse could be used as an alternative. In a step 350 of the method 300, the status indicators are universally set to an "unaccessed" state.

With the initialization phase completed in this manner, it then becomes possible to implement the aforementioned memory access phase of the exemplary method for provisioning data to the cache memory 210. In this phase, the memory access circuitry 200 fulfills memory access requests (e.g., memory read accesses and memory write accesses) originating from the data processing circuitry 110.

FIG. 5 shows a flowchart of an exemplary method 500 for performing a memory access in accordance with an illustrative embodiment of the invention. Although the exemplary method 500 is entirely novel, many individual aspects of the method 500 (e.g., cache hits, cache misses, write policies, and replacement policies) will already be familiar to one having ordinary skill in the computer arts. Moreover, these aspects are discussed in detail in many readily available publications including the book by M. Balch, cited above and already incorporated by reference herein. These more conventional aspects of the method 500 are therefore only briefly discussed while points of novelty are emphasized herein.

As indicated by step 505 of the exemplary method 500, the method is initiated by the data processing circuitry 110 (see FIG. 1) attempting to access a particular memory address (hereinafter, the "accessed memory address") in memory in response to a received memory access request. In response to such a memory access request, the memory access circuitry 200 and, more particularly, the cache access circuitry 240 (see FIG. 2), determines, in step 510, whether the accessed memory address falls within one of the buffer address regions in the buffer allocation array that was created as result of steps 320-350 previously described in conjunction with FIG. 3. When the accessed memory address resides in the buffer allocation array as determined in step 510, the cache access circuitry 240 performs a cache hit or cache miss in step 515. Alternatively, when the accessed memory address does not reside in the buffer allocation array, the cache access circuitry 240 utilizes the buffer allocation array to determine the state of the matching status indicator associated with the accessed memory address in step 520.

As stated above, step 515 causes the data processing circuitry 110 and the memory access circuitry 200 to perform a cache hit or a cache miss. Briefly, a cache hit is performed if a cache line corresponding to the accessed memory address is presently allocated in the cache memory 210. A cache miss, in contrast, is performed if such a cache line is not presently allocated in the cache memory 210. If a cache hit involves a read access (i.e., a "read hit"), the data processing circuitry 110 is allowed to read data directly from the appropriate cache line in the cache memory 210. If the cache hit involves a write access (i.e., a "write hit"), the data processing circuitry 110 is allowed to write data to the appropriate cache line in the cache memory 210. If, instead, the memory access results in a cache miss, the cache memory 210 first allocates a cache line to the accessed memory address. A read access (i.e., a "read miss") then causes the data for this newly allocated cache line to be fetched from the main memory 130. A write access (i.e., a "write miss"), in contrast, allows the data processing circuitry 110 to write data to the newly allocated cache line.

Write hits and write misses resulting from the execution of step 515 may cause the data stored in a cache line for a given address region in the cache memory 210 to temporarily differ from the data in the same address region in the main memory 130. The main memory 130 is therefore frequently updated. Such updates are performed in accordance with one of several write policies. By way of example only, if a "write-through" policy is implemented, for example, the write to the cache memory 210 and the write to the main memory 130 are performed substantially synchronously. If, instead, a "write-back" policy is implemented, only the write to the cache memory 210 is initially performed, and data in the modified cache line is only subsequently copied to the main memory 130 if the modified cache line is about to be evicted from the cache memory 210. A write-back policy is more complex to implement, since it needs to track which of the cache lines have been overwritten, and to mark them as "dirty" (e.g., using data flags or an alternative tracking means) for later writing to the main memory 130.

Moreover, when allocating cache lines in the cache memory 210 in performing a cache miss as a result of executing step 515, the cache memory 210 may have to evict an existing entry. Such an eviction is preferably performed in conformity with one of several known replacement policies (sometimes called "cache algorithms"). One popular replacement policy is a least recently used (LRU) cache algorithm, which acts to replace the least recently used entry in the cache when performing an eviction. Other replacement policies falling within the scope of the claimed invention include, but are not limited to, Belady's Algorithm, most recently used (MRU), random replacement (RR), and least frequently used (LFU).

When the matching status indicator is not set to an "unaccessed" state (i.e., when the matching status indicator is in an "accessed" state), as determined in step 520, the cache access circuitry 240 advances to step 525, which is consistent with step 515 described above. That is, a cache hit or a cache miss is performed by the cache access circuitry 240 in step 525, depending on whether the accessed memory address is presently allocated in the cache memory 210. If the matching status indicator is in an "unaccessed" state as determined in step 520, the cache access circuitry 240 instead causes method 500 to advance to step 530.

Step 530 begins a very different sequence of steps. Specifically, rather than performing a cache hit or cache miss, step 530 causes a cache line to be allocated in the cache memory 210 to the cache-line-sized memory address region between the matching starting memory address and the matching ending memory address corresponding to the accessed memory address, as determined from the buffer allocation array. In so doing, any necessary cache line evictions are handled in accordance with the cache replacement policy (examples of which were described above). At substantially the same time or soon thereafter, step 535 has the newly allocated cache line initialized (i.e., written) with the buffer initialization value set forth in the original buffer allocation request. If the buffer initialization value is zero, for example, the new cache line is initialized with all logical zeros.

In this manner, the memory access circuitry 200, in accordance with steps 530 and 535, acts to allocate a cache line in the cache memory 210 corresponding to a buffer address region and to then initialize that cache line with the buffer initialization value set forth in the original buffer initialization request. After so doing, method 500, executing at least in part in the cache access circuitry 240, advances to step 540, wherein the matching status indicator is switched from an "unaccessed" state to an "accessed" state. Lastly, in step 545, the cache access circuitry 240 allows the data processing circuitry 110 to access the cache in what will, because of the cache line allocation in the step 530, necessarily be a cache hit. This cache hit (i.e., write hit or read hit) is performed in substantially the same manner as a cache hit performed in accordance with steps 515 and 525 previously described.

It is noted that, in initializing the buffer via the method 300, and more generally, in accordance with aspects of the invention, the cache memory 210 itself is not modified. In other words, associating buffer address regions with respective address regions and status indicators during the buffer initialization phase is performed without actually altering any entries in the cache memory 210. Rather, allocating a cache line and initializing it with the buffer initialization value for a particular buffer address region is delayed until the data processing circuitry 110 first attempts to perform a memory access on a memory address covered by that particular buffer address region. Changes to the state of the status indicator assure that such allocation and initialization steps only occur once. More particularly, once allocated and initialized, future memory accesses to that specific buffer address region are allowed to experience cache hits and cache misses without further initialization.

In order to maintain this process through task switches, a buffer allocation array is preferably stored for a particular application when a task switch away from that application occurs, and then reinstated when the matching application is recalled at a later time. The contents of a buffer allocation array may, for example, be stored in a memory stack until recalled in this manner. In so doing, the buffer allocation array maintains a continuing record of what buffer address regions have been initialized with buffer initialization values and which buffer address regions have not been initialized.

Embodiments in accordance with the invention are thereby operative to perform an "on-demand" provisioning of buffer data to a cache memory. Such a feature has several advantages. For instance, when a new application asserts a buffer allocation request like that in the method 300 (FIG. 3) as a result of a task switch, for example, the cache memory is not immediately provisioned with buffer initialization values. Instead, such provisioning is allowed to be performed incrementally as actual memory accesses are made on the relevant memory addresses. In this manner, a cache memory need not necessarily be substantially overwritten (i.e., "flooded") every time a task switch calls for the implementation of a new preset buffer. Program execution cycles, bus transactions, power consumption, and interference with other currently running tasks are thereby beneficially reduced.

As is known in the art, at least a portion of one or more aspects of the methods and apparatus discussed herein may be distributed as an article of manufacture that itself includes a computer readable medium having non-transient computer readable code means embodied thereon. The computer readable program code means is operable, in conjunction with a computer system, to carry out all or some of the steps to perform the methods or create the apparatus discussed herein. The computer readable medium may be a recordable medium (e.g., floppy disks, hard drives, compact disks, EEPROMs, or memory cards) or may be a transmission medium (e.g., a network including fiber-optics, the world-wide web, cables, or a wireless channel using time-division multiple access, code-division multiple access, or other radio-frequency channel). Any medium known or developed that can store, in a non-transitory manner, information suitable for use with a computer system may be used. The computer-readable program code means is intended to encompass any mechanism for allowing a computer to read instructions and data, such as magnetic variations on a magnetic medium or height variations on the surface of a compact disk. As used herein, a tangible computer-readable recordable storage medium is intended to encompass a recordable medium, examples of which are set forth above, but is not intended to encompass a transmission medium or disembodied signal.

At least a portion of the techniques of the present invention may be implemented in an integrated circuit. In forming integrated circuits, identical die are typically fabricated in a repeated pattern on a surface of a semiconductor wafer. Each die includes an element described herein, and may include other structures and/or circuits. The individual die are cut or diced from the wafer, then packaged as an integrated circuit. One skilled in the art would know how to dice wafers and package die to produce integrated circuits. Any of the exemplary elements illustrated in, for example, FIGS. 1 and 2, or portions thereof, may be part of an integrated circuit. Integrated circuits so manufactured are considered part of this invention.

Moreover, it should again be emphasized that the above-described embodiments of the invention are intended to be illustrative only. Other embodiments may use different types and arrangements of elements for implementing the described functionality. These numerous alternative embodiments within the scope of the appended claims will be apparent to one skilled in the art given the teachings herein.

Lastly, the features disclosed herein may be replaced by alternative features serving the same, equivalent, or similar purposes, unless expressly stated otherwise. Thus, unless expressly stated otherwise, each feature disclosed is one example only of a generic series of equivalent or similar features.

What is claimed is:

1. A data processing system, comprising:
    data processing circuitry;
    a cache memory; and
    memory access circuitry, the memory access circuitry operative to perform the steps of: assigning a memory address region to be allocated in the cache memory with a predefined initialization value; allocating a portion of the cache memory to the assigned memory address region only after the data processing circuitry first attempts to perform a memory access on a memory address within the assigned memory address region; and initializing the allocated portion of the cache memory with the predefined initialization value.

2. The data processing system of claim 1, wherein the memory access circuitry, after performing the assigning step, is adapted to perform the initializing step only once until the assigning step is repeated.

3. The data processing system of claim 1, wherein the assigning step further causes the assigned memory address region to be associated with a status indicator.

4. The data processing system of claim 3, wherein the memory access circuitry is further operative to cause a state of the status indicator to be changed upon performing the initializing step.

5. The data processing system of claim 3, wherein the status indicator is implemented at least in part utilizing a data flag.

6. The data processing system of claim 1, wherein the cache memory comprises a random access memory.

7. The data processing system of claim 6, wherein the random access memory is of a static type.

8. The data processing system of claim 1, wherein the portion of the cache memory consists of a cache line.

9. The data processing system of claim 1, wherein the memory address region has a storage capacity equal to that of a cache line in the cache memory.

10. The data processing system of claim 1, wherein at least some of the results of the assigning step are stored in a memory array in the data processing system.

11. The data processing circuitry of claim 1, further comprising a main memory.

12. The data processing system of claim 11, wherein the data processing circuitry is operative to access the cache memory faster than it can access the main memory.

13. The data processing system of claim 11, wherein the main memory comprises a random access memory.

14. The data processing system of claim 13, wherein the random access memory is of a static or dynamic type.

15. The data processing system of claim 1, wherein the assigning step is performed at least in part in response to the execution of computer-readable program code by the data processing system.

16. The data processing system of claim 15, wherein the computer-readable program code comprises a buffer allocation request at least specifying the memory address region and the predefined initialization value.

17. The data processing system of claim 15, wherein the computer readable program code is stored in the data processing system on a computer readable storage medium.

18. The data processing system of claim 1, wherein the memory access circuitry is further operative to perform the step of causing the data processing circuitry to perform a memory access on the allocated portion of the cache memory subsequent to the initializing step.

19. A method for initializing a buffer in a cache memory of a data processing system, the method comprising the steps of:
    assigning a memory address region to be allocated in the cache memory with a predefined initialization value;
    allocating a portion of the cache memory to the assigned memory address region only after the data processing circuitry first attempts to perform a memory access on a memory address within the assigned memory address region; and
    initializing the allocated portion of the cache memory with the predefined initialization value.

20. An integrated circuit comprising:
    data processing circuitry;
    a cache memory; and
    memory access circuitry, the memory access circuitry operative to perform the steps of: assigning a memory address region to be allocated in the cache memory with a predefined initialization value; allocating a portion of the cache memory to the assigned memory address region only after the data processing circuitry first attempts to perform a memory access on a memory address within the assigned memory address region; and initializing the allocated portion of the cache memory with the predefined initialization value.

21. Memory access circuitry for a data processing system comprising data processing circuitry and a cache memory, the memory access circuitry comprising:
    means for assigning a memory address region to be allocated in the cache memory with a predefined initialization value;
    means for allocating a portion of the cache memory to the assigned memory address region only after the data processing circuitry first attempts to perform a memory access on a memory address within the assigned memory address region; and means for initializing the allocated portion of the cache memory with the predefined initialization value.

* * * * *